United States Patent [19]

Sokol et al.

[11] Patent Number: 4,828,307
[45] Date of Patent: May 9, 1989

[54] TAKE APART HUNTER'S DRAG APPARATUS

[75] Inventors: Dennis Sokol, Sterling Heights; William E. Schell, Roseville, both of Mich.

[73] Assignee: E-Zee Drag Corporation, Mt. Clemens, Mich.

[21] Appl. No.: 166,858

[22] Filed: Mar. 11, 1988

[51] Int. Cl.⁴ ............................................. A21B 5/00
[52] U.S. Cl. ...................................... 294/79; 17/44.2
[58] Field of Search ................. 294/79, 74, 17, 26; 17/44, 44.2, 14, 17, 24

[56] References Cited

U.S. PATENT DOCUMENTS

| | | | |
|---|---|---|---|
| 1,033,223 | 7/1912 | Wilson | 294/79 |
| 1,259,012 | 3/1918 | Gooch | 17/44.2 |
| 3,188,130 | 6/1965 | Pietrowicz | 17/44 |
| 3,752,525 | 8/1973 | Hanna et al. | 294/79 |

*Primary Examiner—* Marbert
*Attorney, Agent, or Firm—* Alex Rhodes

[57] ABSTRACT

A take apart lightweight hunter's drag apparatus capable of being carried in a compact arrangement on the body of a hunter, for carrying said apparatus in a disassembled compact arrangement on a hunter and for transporting in an assembled arrangement slain animals and other articles through densely wooded areas and for suspending animals during skinning and quartering, comprising a tubular center member, a rope arranged in the shape of a loop and attached at the ends thereof to the center member, a pair of detachable tubular end members axially aligned and detachably retained to the end portions of the center member, and spring means for detachably retaining the outer members to the center member. At the end of each outer member there is provided a lifting gambrel in planar relationship to the points of attachment at the end of the rope to the center member and which extends angularly outwardly toward the loop shaped portion of the rope for engaging the hocks of the legs of a slain animal when the animal is suspended by the drag apparatus from the limb of a tree during skinning and quartering.

8 Claims, 2 Drawing Sheets

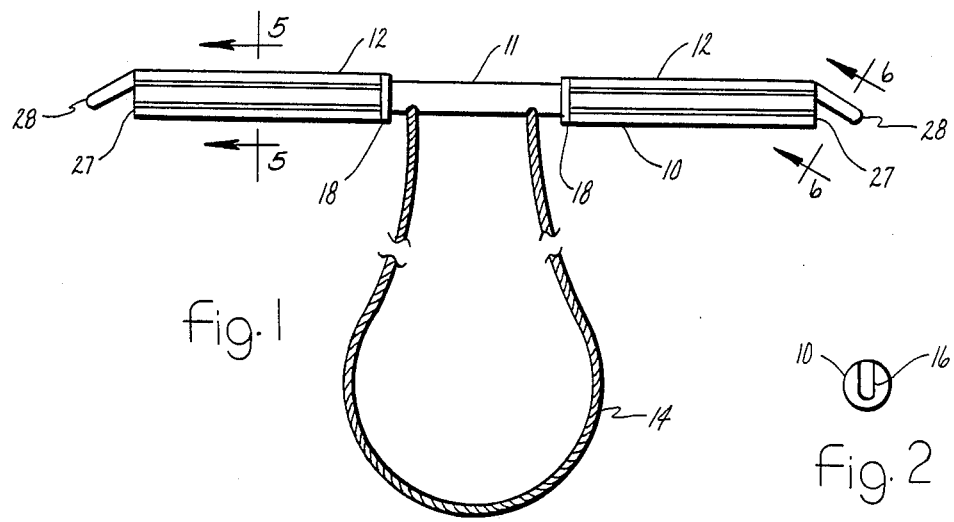
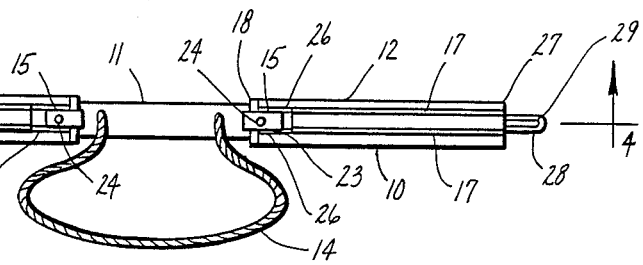
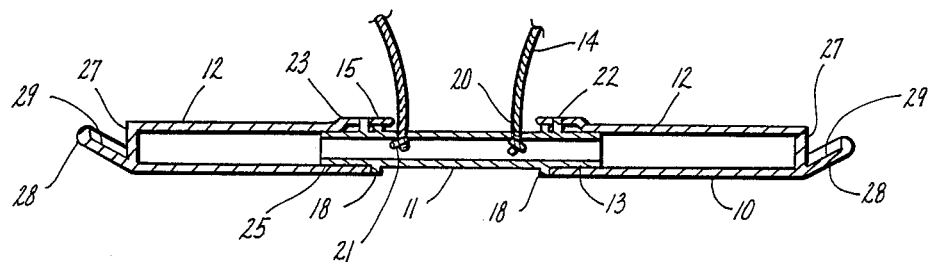
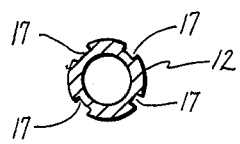

TAKE APART HUNTER'S DRAG APPARATUS

BACKGROUND OF THE INVENTION

After downing a large game animal, such as a deer, the hunter's prize must be transported by a hunter through densely wooded areas which are often covered with swamp, ice, snow or brush. In such instance, wheeled motor vehicles are not suitable and manual means must be used. One method heretofore used is to suspend the animal on a pole and carry the animal to the final destination for skinning and quartering by supporting the ends of the pole on the shoulders of two hunters. This method requires access to a suitable pole and lashing the animal to the pole. This method can be very exhausting because the animal is carried on the shoulders of the hunters.

Another method heretofore used is to elevate and attach one end of the animal to a harness, mounted on the chest and shoulders of the hunter, and to drag the animal to the final destination. This method requires the hunter to carry a bulky harness and relies on only one person to elevate and transport the animal.

From the foregoing it will be apparent that a lightweight, compact game drag apparatus which can be easily carried by a hunter would satisfy an existing need.

SUMMARY OF THE INVENTION

The present invention is a lightweight hunter's drag apparatus capable of being carried in a compact arrangement on the body of a hunter, for transporting slain animals and other articles through densely wooded areas and for suspending animals during skinning and quartering, transporting a slain animal out of densely wooded areas covered with swamp, snow, ice and brush. The invention comprises a tubular center member, a rope arranged in the shape of a loop and attached at the ends thereof to the center member, a pair of tubular end members axially aligned and detachably retained to the end portions of the center member, and spring means for detachably retaining the end members to the center member. At the outer end of each outer member there is provided a lifting gambrel in planar relationship to the points of attachment at the end of the rope to the center member and which extends angularly outwardly toward the loop shaped portion of the rope for engaging the hocks of the legs of a slain animal when the animal is suspended by the drag apparatus from the limb of a tree during skinning and quartering.

One feature of the invention is that the members can be quickly disassembled to compress the apparatus into a compact size for ease of carrying by a hunter.

Another feature is that a common apparatus is used for transporting and suspending the animal for skinning and quartering.

It is a primary object of the invention to provide a lightweight, compact drag apparatus for transporting slain animals and other articles in densely wooded areas covered with swamp, ice, snow and brush.

It is another object in addition to the foregoing object to provide an apparatus for suspending a slain animal during skinning and quartering.

Additional features, benefits and objects of the invention will become apparent from the ensuing description and accompanying drawings which describe the invention in detail. A preferred embodiment and the manner of using the same are disclosed in accordance with the best mode contemplated in practicing the invention and the subject matter in which exclusive property rights are claimed is set forth in each of the numbered claims at the conclusion of the detailed description of the invention.

BRIEF DESCRIPTION OF THE DRAWINGS

FIG. 1 is a front elevational view of a hunter's drag apparatus which embodies the features of the present invention.

FIG. 2 is a left end view of the drag apparatus shown in FIG. 1.

FIG. 3 is a bottom view of the drag apparatus shown in FIG. 1.

FIG. 4 is a cross-sectional view taken on the line 4—4 in FIG. 2.

FIG. 5 is a cross-sectional view drawn to an enlarged scale taken on the line 5—5 in FIG. 1.

FIG. 6 is a cross-sectional view drawn to an enlarged scale taken on the line 6—6 of FIG. 1.

DESCRIPTION OF THE PREFERRED EMBODIMENT

Figure 7:
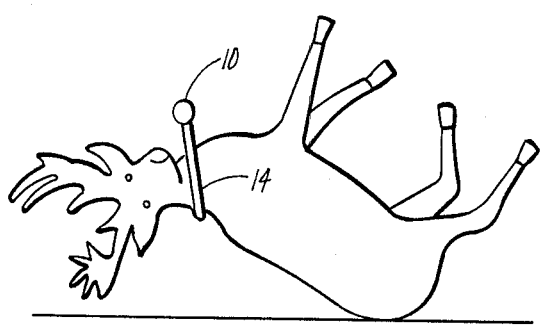
FIG. 7 is a view which depicts the manner of using the apparatus when transporting a deer.

Referring now to the drawings, wherein like numerals designate like and corresponding parts throughout the several views, the particular embodiment of a hunter's drag apparatus, disclosed in FIGS. 1 through 8, inclusive, for purposes of illustrating the invention, comprises a tubular center member 11, a pair of tubular end members 12 which telescopingly engage the end portions 13 of the center member 11, a loop-shaped cord 14 attached to the center member 11, a spring means 15 for retaining the end members 12 to the center member 11, and a lifting means 28 at the end ends 27 of the outer members 12 for suspending slain animals during skinning and quartering.

The center 11 and end 12 tubular members are preferably molded of a lightweight corrosion resistent material, such as the polymer acetal or some other suitable material. The inner end portions 25 of the tubular end members 12 closely engage the inner end portions 13 of the center member 11. On the outside surfaces of the end members there is provided decorative longitudinal grooves 17. As shown in FIGS. 1 and 4, a pair of spaced apart integral circular shoulders 18 are provided on the outer surface of the center member 11 for locating the end members 12 on the center member 11.

In the space between the shoulders 18 of the center member 11 there is a pair of spaced apart apertures 19 which are in parallel relationship to the axis of the center member 11. The end portions 20 of the cord 14 pass through the apertures 19 and are retained to the center member 11 by a common knot 21 or some other suitable means in the interior of the center member 11.

Outside of and adjacent to the shoulders 18 of the center member 11 is a pair of circular pins 22 which are preferably integral with the center member 11. The pins 27 are preferably aligned with the apertures 19 of the center member 11 to simplify the manufacturing of the center member 11 by the molding process.

At the inner end portion of each end member 12 there is a resilient finger 23 which has an aperture 24 for engaging one of the pins 22 of the center member 11. The resilient fingers 23 and pins provide the means for detachably retaining the end members 12 to the center member 11. The fingers 23 are made resilient by the pair of slots 26 at the sides of the fingers 23.

As shown in FIG. 4, the resilient fingers 23 are offset outwardly and extend a small distance beyond the inner ends of the end members 12 whereby they may be easily accessible and lifted to engage or disengage the fingers 23 from the pins 22 of the center member 11 during the disassembly or assembly of the drag apparatus 10.

With reference to FIG. 4, the end portions 27 of the end members 12 are closed and cylindrical shaped gambrel lifts 28 are provided which extend angularly upwardly from the outer ends 27 of the end members 12 toward the loop shaped cord 14. The gambrel lifts 28 are in planar relationship to the apertures 19 of the center member 11 whereby the gambrel lifts 28 are located opposite the points of attachment of the cord 14 to the center member 11. In each of the gambrel lifts 28 there is provided pockets 29 for reducing weight and cost of the towing apparatus 10.

Figure 9:
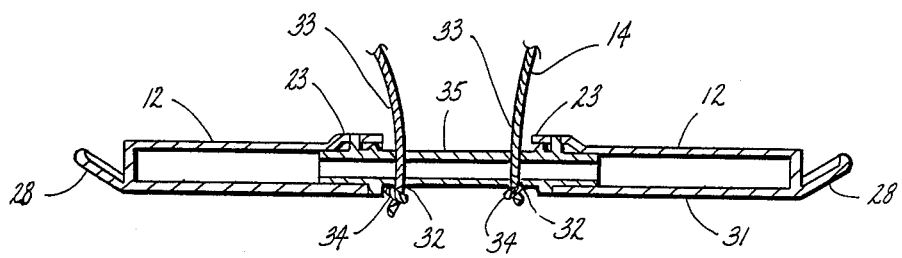
FIG. 9 is a cross-sectional view of an alternate embodiment of the invention when taken in the same manner as FIG. 4.

Referring now to FIG. 9, in the second embodiment 31 shown therein, there is provided an additional pair of apertures 32 which are aligned and in planar relationship with the other pair of apertures 19 of the center member 35. This embodiment 31, permits the cord ends 33 to pass through the center member 11 and be retained by a knot 34 or some other retaining means on the outside of the center member 35.

Figure 8:
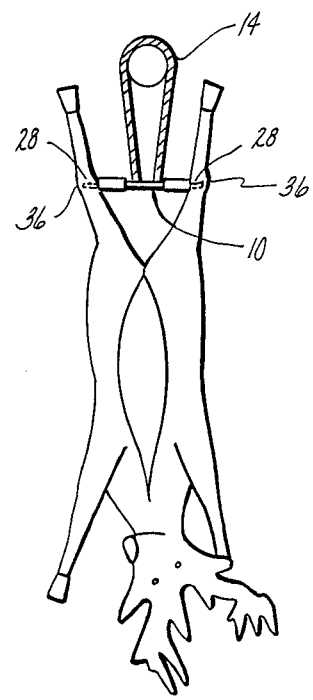
FIG. 8 depicts the manner of using the invention during the quartering and skinning of a slain animal.

The invention is used as follows. With the first embodiment, illustrated in FIGS. 1 through 8, inclusive, the loop portion of the cord 14 is doubled and passed around the neck of a slain animal or other article, such as fire wood, and an outer member 12 is passed through the end of the loop 14 to retain the cord 14 to the neck of a slain animal or article. The head portion of the animal or article is elevated by raising the drag apparatus 10 and the animal or article is dragged in the manner shown in FIG. 5 to a destination point. The use of the gambrel lifts 28 is shown in FIG. 8 wherein openings (not shown) are cut through the tendons of an animal's hock 36 and the gambrel lifts 28 passed through the openings and the animal suspended from the bough of a tree.

The second embodiment 31, described herein, does not require a doubling of the looped cord 14 for the reason that the cord ends 33 may pulled through both sets of apertures 19 and 32 and tied together to attach the cord 14 to a slain animal or other article to be moved.

From the foregoing it is plain to see that what has been accomplished with the present invention is a lightweight, compact towing apparatus which can be easily carried by a hunter when it is not in use and which is effective in transporting slain animals out of densely wooded areas and used to suspend the slain animals for skinning and quartering.

Although but two embodiments have been described, it will be appreciated that by changes in material, size, shape and arrangement of parts, other embodiments can be derived without departing from the spirit thereof.

I claim:

1. A take apart hunter's drag apparatus for carrying said apparatus in a disassembled compact arrangement on a hunter and for transporting slain animals and other articles in densely wooded areas, comprising in combination; a cylindrical center member of a length which is substantially less than the overall length of said drag apparatus; a rope which is adapted for encircling the neck portion of a slain animal arranged in the shape of a loop, said rope being attached at the end portions thereof to said center member; a first detachable cylindrical end member axially aligned with said center member, said end member having an inner end portion and an outer end portion, said inner end portion being detachably retained to an end portion of said center member; a second detachable cylindrical end member axially aligned with said center member, said second outer member having an inner end portion and an outer end portion, said inner end portion being detachably retained to the opposite end portion of said center member; a means for axially aligning said outer members with said center member; and a means for detachably retaining the end portions of said end members to the end portions of said center member.

2. The take apart hunter's drag apparatus recited in claim 1 further comprising a lifting gambrel fixedly extending angularly outwardly from the outer end portion of each of said end members toward the loop shaped rope, said lifting gambrels being disposed in fixed angular relationship to the points of attachment of the ends of the rope to said center member.

3. A take apart hunter's drag apparatus for carrying said apparatus in a disassembled compact arrangement on a hunter and for transporting in an assembled arrangement slain animals and other articles in densely wooded areas, comprising in combination: a tubular center member of a length which is substantially less than the overall length of said drag apparatus having a pair of spaced apart lengthwise relationship apertures through said member for receiving the ends of a rope; a rope which is adapted for encircling the neck portion of a slain animal arranged in the shape of a loop, the ends of said rope extending through said apertures and retained in the interior of the center member; a first detachable tubular member axially aligned with and detachably retained to an end portion of said center member, said end member having an inner end portion and an outer end portion, said inner end portion telescopingly engaging the end portion of the center member; a second detachable tubular end member axially aligned with and detachably retained to the opposite end portion of said center member, said end member having an inner end portion and an outer end portion, said inner end portion telescopingly engaging the opposite end portion of the center member; and a means for detachably retaining the end portions of said end members to the end portions of said center member.

4. The take apart hunter's drag apparatus recited in claim 3 wherein said means for detachably retaining said outer members to said center member is a spring means.

5. A take apart hunter's drag apparatus for carrying said apparatus in a disassembled compact arrangement on a hunter and for transporting in an assembled arrangement slain animals and other articles in densely wooded areas, comprising in combination: a cylindrical center member; a rope arranged in the shape of a loop, said rope being attached at the end portions thereof to said center member; a first detachable cylindrical end member axially aligned with said center member, said end member having an inner end portion and an outer end portion, said inner end portion being detachably retained to an end portion of said center member; a second detachable cylindrical end member axially aligned with said center member, said second outer member having an inner end portion and an outer end portion, said inner end portion being detachably retained to the opposite end portion of said center member; a means for axially aligning said outer members with said center member; and a spring means for detachably retaining the end portions of said end members to the end portions of said center member, said spring means for detachably retaining each end member to said center member comprises a resilient finger on the end portion of the end member, having an aperture for receiving a pin; and a pin extending radially outwardly from the end portion of the center member for detachably engaging the aperture of said center member.

6. The take apart hunter's drag apparatus recited in claim 3 further comprising: a cylindrical lifting gambrel fixedly extending angularly outwardly from the outer end portion of each of said end members toward the loop shaped rope, said lifting gambrels being disposed in planar relationship to the apertures of said center member for attaching the end portions of said rope.

7. A take apart hunter's drag apparatus for carrying said apparatus in a disassembled compact arrangement on a hunter and for in assembled relationship transporting slain animals and other articles in densely wooded areas, comprising in combination: a tubular center member of a length which is substantially less than the overall length of said drag apparatus having one pair of spaced apart apertures in lengthwise relationship through said center member and another pair of spaced apart apertures aligned with said first pair through said opposite side of the center member for receiving the ends of a rope; a rope which is adapted for encircling the neck portion of a slain animal arranged in the shape of a loop, the ends of said rope extending through both of said pairs of apertures and retained to the exterior of said center member; a first detachable tubular end member axially aligned with and detachably retained to an end portion of said center member, said end member having an inner end portion and an outer end portion, said inner end portion telescopingly engaging the end portion of the center member; a second detachable tubular outer member axially aligned with and detachably retained to the opposite end portion of said center member, said end member having an inner end portion and an outer end portion, said inner end portion telescopingly engaging the opposite end portion of the center member; and a means for detachably retaining the end portions of said end members to the end portions of said center member.

8. The take apart hunter's drag apparatus recited in claim 7 wherein said means for retaining the ends of said rope to the exterior of the center member is a knot at the ends of the rope.

* * * * *